Jan. 27, 1931.  A. WINKLER ET AL  1,790,361
PROCESS AND APPARATUS FOR APPLYING CLOSURES TO HOLLOW CHOCOLATE BODIES
Filed April 12, 1930
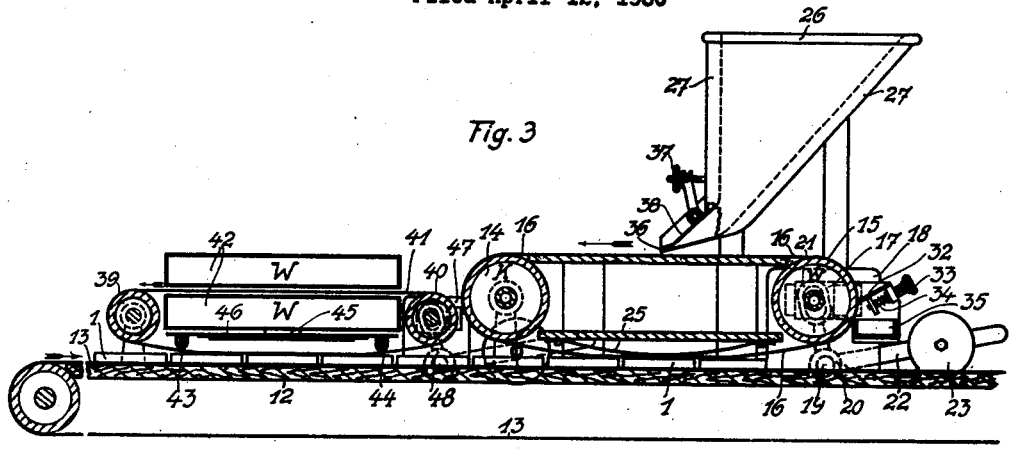
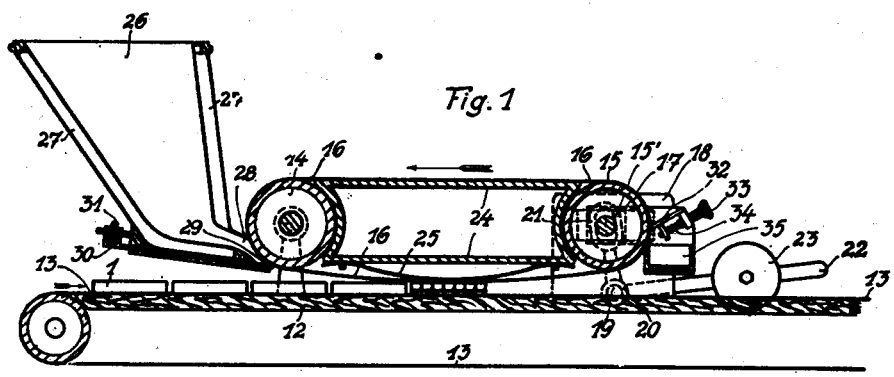
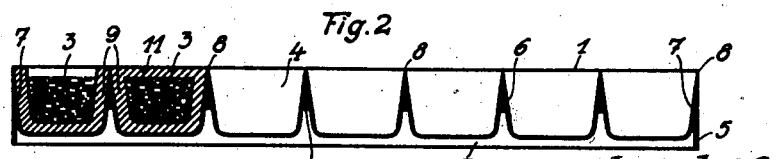
Inventors.
Alfred Winkler
and Max Dünnebier.
per W. Wallace White Attorney.

Patented Jan. 27, 1931

1,790,361

UNITED STATES PATENT OFFICE

ALFRED WINKLER AND MAX DÜNNEBIER, OF NEUWIED, GERMANY

PROCESS AND APPARATUS FOR APPLYING CLOSURES TO HOLLOW CHOCOLATE BODIES

Application filed April 12, 1930, Serial No. 443,864, and in Germany May 30, 1928.

This invention relates to a process and apparatus for applying closures to hollow chocolate bodies.

Hollow chocola'e bodies provided with a liquid or other filling are usually made with the aid of molds which are first filled completely with liquid chocolate and reversed after a certain period, so that the mass adheres only to the inner walls of the mold and thus forms a shell. The mold is then scraped off on its upper side, so that the shells present smooth and uniform edges. The filling is then introduced and the operation is completed by the application of a closure or lid to the open mouth of the hollow body or shell.

The difficulty in attaching the closure or lid consists mainly in the fact that, particularly with liquid filling material, a bending or sagging of the closure or lid into the liquid material or into the hollow spaces which may still exist, must positively be avoided.

One object of the present invention is a process and an apparatus for the mechanical manufacture and attachment of the mold closures or lids by a continuous, uninterrupted or intermittent process, whereby a thoroughly satisfactory closure is provided, the desired polish or smoothness is obtained and a smearing up of the molds or their conveying means is avoided.

In accordance with this invention a rapid operation and the use of the widely varied shapes of molds in one and the same working process and apparatus is accomplished.

According to this invention, the mass is applied in the first place to a travelling endless band whose temperature is variable and which has a very smooth surface. By suitable regulation of the heat and liquid degree of the mass and the temperature of the band, the thickness of the layer applied can be regulated in such a way as to adapt it to the actual needs at any time; and an excessive consumption of material is thus avoided. The smooth surface of the endless band, which may be a polished steel band, ensures the desired polish on the outer surface of the closure. The band also has the additional advantage that the mass, although it solidifies at its place of contact with the band, retains its plastic flexibility on its outer surface, which is important for the continuance of the process. This continuation is characterized by the fact that the mass layer is taken off from the band directly by the molds containing the prepared work, for which purpose the upper mold edges are of knife-like form so that they take exactly the required quantity of mass from the layer spread out on the band. This process is characterized on the one hand by the cooling of the band and on the other hand by safeguarding the plastic flexibility of the outer surface of the mass which thus combines directly with the shell edges and adheres to the same.

With the above and other objects in view, the invention consists in the novel process and in the novel arrangement of parts hereinafter described with reference to the accompanying drawings and particularly pointed out in the appended claims, it being understood that various changes in the process and in the minor details of the construction may be made without departing from the spirit of the invention or sacrificing any of the advantages thereof.

In the drawings:

Fig. 1 is a vertical longitudinal section showing one form of the apparatus; Fig. 2 is a vertical longitudinal section showing one of the molds; and Fig. 3 is a vertical longitudinal section showing a second form of the apparatus.

The casting mold 1 shown at Fig. 2 is made of smooth, polished sheet steel and in the example shown comprises seven cross rows of individual molds 4 which are connected together at the points 2 by soldering or otherwise to form the complete mold. An external frame 5 made of flat steel surrounds the whole. The partitions 6 between individual molds 4 and the outer walls 7 are formed with knife-like edges 8 at their upper edges.

The left-hand individual mold 4 is shown with a shell 9 of chocolate formed therein in any suitable or well known manner and also shows the filler 3 introduced into the shell. This shell formation is of course effected simultaneously in all individual cavities of the combination mold. In the individual mold second from the left a chocolate shell is shown with a closure or lid applied thereto. This is the finished work as it is taken from the mold.

In the apparatus shown in Fig. 1 the molds 1 above described, after having been prepared with shells and fillers in the known manner are fed to a conveyor band 13 guided over a delivery table 12 and moving in the direction of the arrow. This table 12 with the conveyor band 13 is variable in its height, i. e., in the vertical direction, by suitable and well known means. Above the band 13 are mounted two hollow rollers 14 and 15 carrying an endless band 16, for instance a polished steel band. The left-hand roller 14 is mounted on a stationary axis and is driven, while the right-hand roller 15 is rotated only by the band 16 and has a shaft 15′ each end of which is mounted in a sliding block 17, guided in brackets or guides 18. The extreme end of the shaft 15′ at each side of the apparatus is engaged by an elongated hole in the arm 21 of a double armed lever mounted on a pin 19 and the other arm 22 of said lever carries a displaceable weight 23 for controlling the tension of the band 16 which travels in the direction of the arrow at the same speed as the conveyor band 13. Between the two rollers 14 and 15 a closed receptacle 24 is provided for the reception of a cooling medium, and the upper surface of this receptacle supports the upper strand of the band 16. Against the lower surface of the said receptacle is a flat spring 25 which in turn bears with its lower surface upon the inner surface of the lower strand of the band 16. By suitable regulation of the flat spring 25 and adjustment of the weight 23 the sagging of the band 16 can be conveniently regulated, and well-known devices may also be provided whereby the tension of the spring 25 may be adjusted.

Alongside of the roller 14 is arranged a receptacle 26 which has double walls to form a jacket or space 27 for a heating medium to regulate the degree of heat and the fluidity of the mass in the receptacle. The outlet 28 of the receptacle 26 is closed at its upper part by the band 16 on the roller 14 and between the lower edge of the outlet 28 and the band 16 a slot 29 is provided and may be varied by a slide 30 adjusted by a screw device 31, so that the layer thickness of the mass leaving the slot 29 and meeting the band 16 can be accurately regulated.

The height of the table 12 with the conveyor band 13 guided upon it is such that the molds 1 on the band 13, when passing through the most restricted point between the band 16 and the conveyor band 13 are pressed with their sharp upper edges sufficiently hard against the yielding band 16 that the mass is stamped out in accordance with the outlines of the mold, and the stamped out portions thus serve as closures or lids for the shells in the molds. By a suitable adjustment of the temperature in the cooling receptacle 24 the temperature of the band 16 can be regulated so that the mass layer applied thereto immediately solidifies at the point of contact with the band and it is possible to obtain a high polish of the corresponding surface and to produce a relatively heavy mass layer with the plastic property of this layer and its temperature retained on the outer surface to such an extent that the closures or lids combine completely with the shells in the molds. As the molds, finished and covered in this manner, continue to advance upon the conveying band 13 and are finally removed therefrom with the now finished work ready for delivery, a scraper 32 removes the parts of the mass remaining on the band 16, which parts are either collected in a receptacle 35 or are received directly by a heated chute by which they are conveyed for further use. The pressure of the scraper is provided by a compression spring 34 which may be adjusted by means of a set screw 33. Any parts of the mass which may have been dropped on to the conveying band 13, can be easily removed therefrom and collected, as they are no longer in liquid condition.

The arrangement of the mass receptacle 26 is such that the mass leaves the slot 29 in a direction which coincides with the direction of the band 16 in its lower strand, so that the band 16 is not subjected to any change in direction from the point of application of the mass to the point of application to the mold, so that the danger of breaking or tearing the mass on the conveyor is eliminated.

The short distance between the point of application of the mass to the band 16 and the point of delivery to the mold ensures that the surface of the mass remains sufficiently warm and plastic to combine completely with the shells in the molds.

In the form of apparatus shown at Fig. 3 the band 16 is not subjected to a uniform continuous cooling but is both heated and cooled as it travels around the rollers 14, 15. The roller 15 at the right is heated internally at W and the band 16 is heated thereby, and during its passage around the left-hand roller 14, which is cooled internally at K, the band is cooled. The mass receptacle 26 in this case is arranged above the upper strand of the band 16 and has a delivery outlet mouthpiece 36 which can be regulated by means of a flap 38 operated by screw device 37 for the desired thickness of the mass to be applied. The band 16 is thus subjected to temperature control so that at the moment when the mass is applied it has approximately the same temperature as the band. After the mass has been applied, the band 16 then, during its passage around the roller 14, is gradually cooled with the mass thereon. This cooling is so regulated that the mass can be removed with certainty by the molds 1 from the band 16.

In this arrangement the molds are heated at their upper sharp edges at 8 (Fig. 2) prior to the application of the closures to such an extent that the upper edges of the shells are heated and a good connection with the closures is ensured. For heating the edges of the molds an endless band 41 of sheet steel or some other good heat conductor is carried by two guide rollers 39 and 40 and has its upper strand heated by a device W comprising two heated receptacles 42. The lower strand of the band 41 runs against two rollers 43 and 44 supported at the ends of a laminated spring 46 secured at 45 to the said heating receptacle 42. Here, too, the right-hand driven guide roller 40 of the band 41 is supported in brackets or guides 47 and is subject to the effect of a double-armed weight lever 48 by which the tension of the band 41 is regulated.

The delivery table 12 is adjustable in height so that the molds 1 may be caused to engage both the lower strand of the band 41 and that of the band 16. For the heating effect of the band 41, it is of course sufficient if the molds travel in close proximity to but without actually engaging such band. This band 41 is moved at the same speed as is the conveyor band 13 which feeds the molds 1.

The molds on the conveyor band 13 first pass under the band 41 and, on account of the heating of the latter by the heating receptacles 42, the upper edges of the molds are heated to a degree that can be regulated at will by the heat regulation of the receptacles 42, and can be so chosen that the upper edges of the shells in the molds assume a temperature suitable for the secure connection or consolidation with the closure pieces which are successively applied, and without danger of the central surface of these closure pieces being heated to such an extent that a sagging or collapse of the closures upon the filler would be possible. By this arrangement the observance of very special care in the heat regulation of the mass upon the band 16 is unnecessary.

As compared with the heating devices heretofore known for the same purpose and which consist of a heating plate or of hot air nozzles, the present apparatus has the advantage that the band moving along with the molds permits, with slight heat supply, on acount of its close adherence to the upper mold edges, of a thorough heating which nevertheless acts only upon the uppermost edge of the chocolate envelope.

What we claim is:

1. A process for applying closures to hollow chocolate bodies which comprises forming, on a travelling band, a layer of material having a thickness to suit the closure to be formed, and applying pressure to cut the layer and unite the material of the layer with the edges of the bodies.

2. A process for applying closures to hollow chocolate bodies which comprises forming, on a travelling band, a layer of material having a thickness to suit the closure to be formed, cooling the band to solidify the side of the material in contact therewith, and applying pressure to unite the material of the other side of the layer with the edges of the bodies.

3. A process for applying closures to hollow chocolate bodies which comprises forming, on a travelling band, a layer of material having a thickness to suit the closure to be formed, cooling the band to solidify the material in contact therewith, heating the edges of the bodies, and pressing the layer upon the edges of the bodies to form the closures.

4. A process for applying closures to hollow chocolate bodies which comprises forming, on a travelling band, a layer of material having a thickness to suit the closure to be formed, heating the band to approximately the temperature of the material received thereby, cooling the band to solidify the material in contact therewith, and applying pressure to unite the material of the layer with the edges of the bodies.

5. A process for applying closures to hollow chocolate bodies which comprises forming, on a travelling band, a layer of material having a thickness to suit the closure to be formed, heating the band to the temperature of the material received thereon, cooling the band and the material in contact therewith, heating the edges of the bodies, and pressing the material upon the edges of the bodies to form the closures.

6. Apparatus for applying closures to hollow chocolate bodies comprising a receptacle for the material to form the closures, a travelling band for receiving a layer of the said material from the receptacle, means for supporting the molds carrying the bodies to receive the closures and means for pressing the band against the molds to cut the layer of material and apply same to the edges of the bodies in said molds.

7. Apparatus for applying closures to hollow chocolate bodies comprisng a travelling band for receiving a layer of the material to form the closures, a pair of spaced rollers carrying the band, means for conveying the molds carrying the bodies to receive the closures and a spring device for pressing the lower strand of the travelling band downwardly into contact with the edges of the molds to cut said layer and to apply the closures.

8. Apparatus for applying closures to hollow chocolate bodies comprising a travelling band for receiving a layer of the material to form the closures, a cooling member located between the strands of the band, means for conveying the chocolate bodies in contact with the band strand carrying the layer of material to form the closures, and means for exerting pressure to divide the said layer into separate parts to serve as closures.

9. Apparatus for applying closures to hollow chocolate bodies comprising a travelling band for receiving a layer of the material to form the closures, means for driving the band, a cooling member serving as a support for the upper strand of the band, means for supporting the molds carrying the bodies to receive the closures and means for pressing the lower strand of the band downwardly towards the molds to apply the layer of material to the edges of the bodies in said molds.

10. Apparatus for applying closures to hollow chocolate bodies comprising a receptacle for the material to form the closures, a travelling band for receiving a layer of the said material from the receptacle, means for supporting the molds carrying the bodies to receive the closures and means adjacent to the point of delivery of the said receptacle for pressing the band against the molds to cut the layer of material into separate parts to form the closures for the bodies.

11. Apparatus for applying closures to hollow chocolate bodies comprising a travelling band for receiving a layer of the material to form the closures, means for engaging the layer on said band with the edges of the hollow bodies to apply the closures and means for alternately heating and cooling the band so that it receives the material at approximately the temperature of the material and is gradually cooled until it reaches the point of application to the bodies.

12. Apparatus for applying closures to hollow chocolate bodies comprising a receptacle for the material to form the closures, a travelling band for receiving a layer of the said material from the receptacle, means whereby the part of the band adjacent to the said receptacle is heated to a temperature approximately equal to the said material, means for supporting the molds carrying the bodies to receive the closures, means for engaging the layer of material with the edges of the molds to apply the closures, and means for cooling the layer of material on the band before the point of said engagement.

13. Apparatus for applying closures to hollow chocolate bodies comprising a receptacle for the material to form the closures, a horizontal travelling band for receiving a layer of the said material from the receptacle, means for supporting the band, means for conveying molds containing the bodies to receive the closures and means engaging the upper surface of the lower strand of the band for pressing the said strand downwardly upon the molds to cut the said layer into parts and to apply the said parts as closures to the edges of the bodies.

14. Apparatus for applying closures to hollow chocolate bodies comprising a receptacle for the material to form the closures, a travelling band for receiving a layer of the material from the receptacle, a pair of spaced rolls for supporting and driving the band, means for conveying the bodies to receive the closures beneath the said band at the same speed as the band, and means for pressing the band downwardly upon the edges of the molds to cut the said layer into sections to form the closures for the bodies.

15. Apparatus for applying closures to hollow chocolate bodies comprising a receptacle for the material to form the closures, a horizontal travelling band for receiving a layer of the said material from the receptacle, means for supporting and driving the band, means for conveying molds containing the bodies to receive the closures, means for heating the edges of the molds before the application of the closures and means for pressing the band downwardly upon the molds to apply the closures to the edges of the bodies.

16. Apparatus for applying closures to hollow chocolate bodies comprising a receptacle for the material to form the closures, a travelling band for receiving a layer of the material from the receptacle, a pair of rolls for supporting and driving the band, means for conveying the bodies to receive the closures, a heated band for heating the edges of the said bodies before the application of the closures thereto, and means for pressing the band downwardly upon the edges of the bodies to apply the closures thereto.

17. Apparatus for applying closures to hollow chocolate bodies comprising a travelling band for receiving a layer of the material to form the closure, means for supporting the molds carrying the bodies to receive the closures, knife edges formed on the sides of the molds and means for pressing the layer carried by said band on to said molds to apply the closures.

18. Apparatus for applying closures to hollow chocolate bodies comprising a travelling band for receiving a layer of the material to form the closure, means for supporting the molds carrying the bodies to receive the closures, knife edges formed on the sides of the molds, a travelling band for applying heat to the said knife edges and to the edges of the said bodies before the application of the closures, and means for pressing the layer upon the bodies to apply the closures.

In testimony whereof we have signed our names to this specification.

ALFRED WINKLER.
MAX DÜNNEBIER.